US007255909B2

(12) United States Patent
Mann et al.

(10) Patent No.: US 7,255,909 B2
(45) Date of Patent: Aug. 14, 2007

(54) SECURITY LAMINATE

(75) Inventors: Graeme R. Mann, Sussex Inlet (AU); Brian W. Dunne, Cambridge Park (AU); Paul D. Graham, Woodbury, MN (US); Thomas Junck, Neuss (DE); Mark F. Schulz, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 78 days.

(21) Appl. No.: 10/360,211

(22) Filed: Feb. 6, 2003

(65) Prior Publication Data

US 2003/0170425 A1 Sep. 11, 2003

Related U.S. Application Data

(60) Provisional application No. 60/357,909, filed on Feb. 19, 2002.

(51) Int. Cl.
*B32B 5/16* (2006.01)
*G02B 5/128* (2006.01)
*B42D 15/00* (2006.01)

(52) U.S. Cl. ...................... 428/143; 428/206; 428/207; 428/325; 428/916; 428/32.34; 283/72; 283/87; 283/91; 359/538; 359/536; 347/105; 347/106

(58) Field of Classification Search ................ 428/143, 428/206, 207, 325, 916, 32.34; 283/72, 91, 283/87; 359/538, 536; 347/105, 106
See application file for complete search history.

(56) References Cited

U.S. PATENT DOCUMENTS 2,354,048 A * 7/1944 Palmquist .................... 40/615
3,700,305 A 10/1972 Bingham
3,752,774 A 8/1973 Stiles
3,758,192 A 9/1973 Bingham
3,770,439 A 11/1973 Taylor
3,801,183 A 4/1974 Sevelin et al.
3,877,786 A * 4/1975 Booras et al. .............. 359/539
4,153,412 A 5/1979 Bailey
4,605,592 A 8/1986 Paquette et al.
4,688,894 A * 8/1987 Hockert ...................... 359/537
4,775,594 A 10/1988 Desjarlais (Continued)

FOREIGN PATENT DOCUMENTS

DE 38 13 301 11/1989

(Continued)

OTHER PUBLICATIONS

U.S. Appl. No. 09/591,075, filed Jun. 9, 2000, Improved Porous Inkjet Receptor Media.

(Continued)

*Primary Examiner*—William P. Watkins, III
(74) *Attorney, Agent, or Firm*—Melissa E. Buss

(57) ABSTRACT

In one aspect, the invention provides a security laminate comprising a retroreflective layer comprising a plurality of retroreflective microbeads partially embedded in and protruding from a beadbond layer and having image receptive material disposed around the protruding microspheres. In another embodiment, the security laminate further comprises indicia patterns viewable in retroreflective light. In another embodiment, the security laminate is imaged on the image receptive material.

15 Claims, 1 Drawing Sheet

U.S. PATENT DOCUMENTS

| | | | | |
|---|---|---|---|---|
| 5,045,386 | A | 9/1991 | Stan et al. | |
| 5,126,195 | A | 6/1992 | Light | |
| 5,141,790 | A | 8/1992 | Calhoun et al. | |
| 5,169,707 | A * | 12/1992 | Faykish et al. | 428/195.1 |
| 5,198,306 | A | 3/1993 | Kruse | |
| 5,656,378 | A | 8/1997 | Lambert | |
| 5,766,398 | A | 6/1998 | Cahill et al. | |
| 5,916,673 | A | 6/1999 | Fryberg et al. | 428/328 |
| 5,942,335 | A | 8/1999 | Chen et al. | |
| 6,045,894 | A | 4/2000 | Jonza et al. | |
| 6,060,157 | A * | 5/2000 | LaPerre et al. | 428/325 |
| 6,190,757 | B1 * | 2/2001 | Nelson et al. | 428/32.86 |
| 6,288,842 | B1 | 9/2001 | Florczak et al. | |
| 6,357,871 | B1 | 3/2002 | Ashida et al. | |
| 6,386,699 | B1 | 5/2002 | Ylitalo et al. | |
| 6,500,527 | B2 | 12/2002 | Miller | |
| 6,548,164 | B1 | 4/2003 | Bacon, Jr. | |
| 6,649,249 | B1 | 11/2003 | Engle et al. | |
| 6,720,043 | B1 | 4/2004 | Sismondi et al. | |
| 2002/0196144 | A1 | 12/2002 | Belka et al. | |
| 2004/0262909 | A1 | 12/2004 | Bauer et al. | |

FOREIGN PATENT DOCUMENTS

| | | |
|---|---|---|
| EP | 0 655 346 | 5/1995 |
| EP | 0 570 515 B1 | 6/1996 |
| EP | 0 968 836 | 1/2000 |
| EP | 1 008 457 | 6/2000 |
| EP | 1 016 546 | 7/2000 |
| WO | 99/10184 | 3/1999 |
| WO | WO 00/73082 A1 | 12/2000 |

OTHER PUBLICATIONS

U.S. Appl. No. 09/583,295, filed May 31, 2000, Random Microembossed Receptor Media.

U.S. Appl. No. 10/183,121, filed Jun. 25, 2002, Complex Microstructure Film.

U.S. Appl. No. 10/183,122, filed Jun. 25, 2001, Complex Microstructure Film.

U.S. Appl. No. 10/361,413, filed Feb. 11, 2003, Image Receptive Material Comprising Cationically Charged Inorganic Particles.

U.S. Appl. No. 10/361,414, filed Feb. 11, 2003, Polyvinylpyridine Image Receptive Material.

Patent Abstracts of Japan, vol. 012, No. 459 (M-770) (Dec. 2, 1988) & JP 63 183874 A (Jul. 29, 1988) (abstract).

* cited by examiner

SECURITY LAMINATE

CROSS REFERENCE TO RELATED APPLICATION

This application claims priority to U.S. Provisional Patent Application No. 60/357,909, filed Feb. 19, 2002.

BACKGROUND

The invention relates to security laminates for use as a security feature on or in documents.

Documents of value such as passports, identification cards, entry passes, ownership certificates, financial instruments, and the like, are often assigned to a particular person by personalization data. Personalization data, often present as printed images, can include photographs, signatures, fingerprints, personal alphanumeric information, and barcodes, and allows human or electronic verification that the person presenting the document for inspection is the person to whom the document is assigned. There is widespread concern that forgery techniques can be used to alter the personalization data on such a document, thus allowing non-authorized people to pass the inspection step and use the document in a fraudulent manner.

A number of security features have been developed to authenticate the document of value, thus preventing forgers from producing a document, which resembles the authentic document during casual observation, but lacks the overt or covert security features known to be present in the authentic document. Overt security features include holograms and other diffractive optically variable images, embossed images, and color-shifting films, while covert security features include images only visible under certain conditions such as inspection under light of a certain wavelength, polarized light, or retroreflected light. Even more sophisticated systems require specialized electronic equipment to inspect the document and verify its authenticity. Often, these security features are directed at verifying the authenticity of the parent document, but convey little information regarding the authenticity of the personalization data. Further features that convey information about, or prevent, tampering with the personalization data are needed.

Of particular interest today is the ability to be able to determine that a forgery has been attempted without the need to resort to a special tool. There is a strong desire to be able to determine such tamper attempts using normal lighting conditions such as diffuse incandescent or fluorescent light sources.

Commonly, the personalization data on documents of value is protected by encapsulation of the printed images between laminated layers, one or more layers of such laminates often being designed to show visible evidence of tampering. Production of a document which protects the personalization data by encapsulation requires hardware which can perform the combined functions of printing and heat laminating, often including the associated functions of roll feeding and die cutting. While such hardware is available, it can be rather complex and expensive, often beyond the reach of smaller issuing authorities.

Of additional concern is that typically the laminate and the data being protected by the laminate are resident in two discrete and separate layers and it is a commonly attempted practice to carefully separate the two layers and alter the data without inflicting any visible damage to the security document. There would be great utility and value in a technology which enabled simple, fast and inexpensive production of personalized documents of value having durability and tamper resistance.

SUMMARY

In one aspect, the invention provides a security laminate comprising a retroreflective layer comprising a plurality of retroreflective microbeads partially embedded in and protruding from a beadbond layer and having image receptive material disposed around the protruding microspheres in a manner such that the microbeads remain retroreflective. In another embodiment, the security laminate further comprises indicia patterns viewable in retroreflected light. In another embodiment, the security laminate is imaged on the image receptive material.

In another aspect, the invention provides a security document wherein a security laminate of the invention is inserted into or otherwise attached to a document.

In another aspect, the invention provides a method of making an imaged security laminate comprising the step of printing an image onto a security laminate of the invention.

In another aspect, the invention provides a method of making a security document comprising the steps of providing a security laminate of the invention and providing instructions for printing and attaching said security laminate to a document of value.

The term "retroreflective" as used herein refers to the attribute of reflecting an incident light ray in a direction antiparallel to its incident direction, or nearly so, such that it returns to the light source or the immediate vicinity thereof.

The present invention provides a security laminate that indicates physical tampering with an image on the image receptive material by dislodgement of microbeads. Dislodgement of microbeads results in either a loss of retroreflectivity, or in the observation of clear patches in the laminate when viewed against a normal light source. The security laminates of the invention also indicate tampering by destruction of the laminate or separation of paper fibers from a document during delamination or attempted delamination. The security laminates of the invention may also include one or more overt or covert security features, including security indicia that are only visible by inspection under retroreflected light.

DETAILED DESCRIPTION

The security laminate of the present invention comprises an image receptive material disposed onto a retroreflective layer such that when an image is provided on the image receptive material, the retroreflective layer and a security indicia is visible under retroreflected light but are not substantially perceptible with an unaided eye under normal lighting conditions. The construction of the security laminate of the invention is such that the security features and the printed images are combined into a single layer.

In an embodiment of the invention, the security laminate is transparent. In other embodiments of the invention, the security laminate is translucent. Such embodiments of the invention may include security features such that printed images may be observed in reverse format on the rear side and evidence of tampering in the laminate may be detected by holding the laminate against normal lighting conditions.

As used herein, the term "normal lighting conditions" refers to the presence of ambient light that is substantially diffused, as with light typically used to light a room. The term "retroreflected light" refers to ambient light that is substantially collimated, as with the light cast by the headlight of an automobile, or by a flashlight, and returns to the light source or the immediate vicinity thereof. The term "unaided eye" means normal (or corrected to normal) human vision not enhanced by, for example, magnification.

Figure 1:
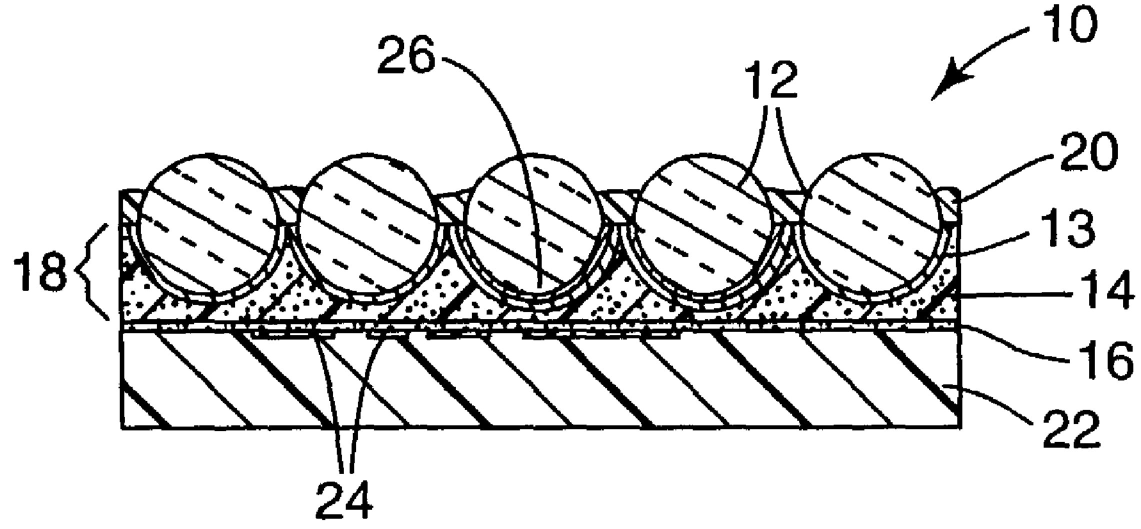
FIG. 1 is an illustrative cross-section of an embodiment of a security laminate of the invention bonded to a substrate.

As shown in FIG. 1 in cross-section, one embodiment of a security laminate 10 of the present invention comprises retroreflective glass microbeads 12 having a reflector layer 13 partially embedded in and protruding from a beadbond 14 (together, retroreflective layer 18), an adhesive layer 16 bonded to the beadbond, and image receptive material 20 disposed between and/or around the microbeads. In this FIG. 1, the security laminate 10 is bonded to a substrate 22 wherein the substrate has an overt indicia 24 that is preferably visible through the security laminate 10 when viewed under normal lighting conditions. In this embodiment, the retroreflective layer is substantially transparent with overt indicia 24 being visible when illuminated under normal lighting conditions and the retroreflective layer 18 with a covert security indicia 26 is visible when illuminated by retroreflected light. An example of such a retroreflective layer is CONFIRM Security Laminate. CONFIRM Security Laminate comprises an exposed monolayer of glass microbeads, indicia patterns printed on the back surface of the microbeads, a transparent reflector layer on the back surface of the printed indicia and the microbeads, and a beadbond layer. The reflector layer is preferably a transparent, high refractive index material as described in U.S. Pat. No. 3,801,183, incorporated by reference herein.

Figure 2:
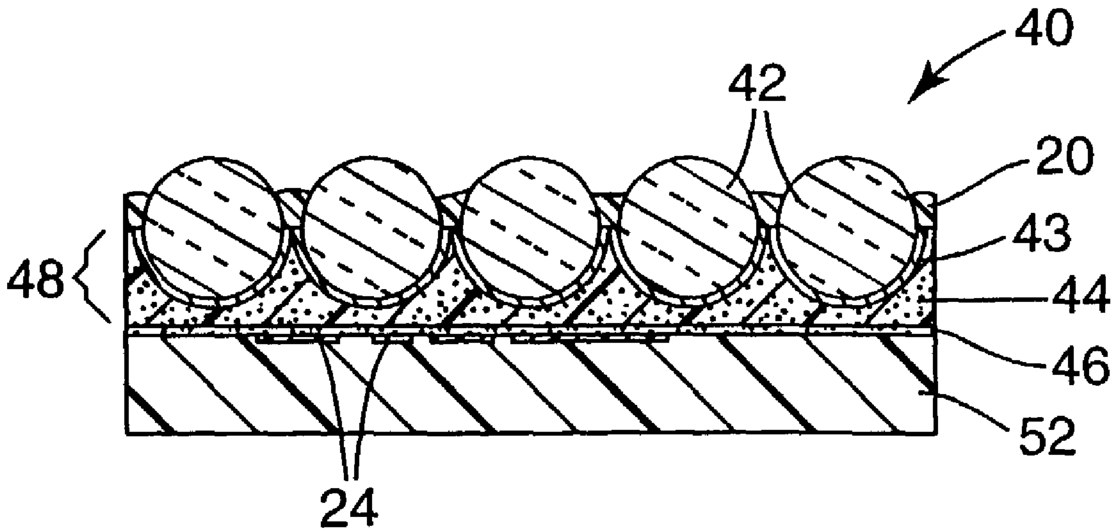
FIG. 2 is an illustrative cross-section of another embodiment of a security laminate of the invention bonded to a substrate.

Another embodiment of the present invention of the invention is shown in FIG. 2. In this embodiment, security laminate 40 comprises retroreflective glass microbeads 42 having a reflector layer 43 partially embedded in and protruding from a beadbond 44 (together, retroreflective layer 48), an adhesive layer 46 bonded to the beadbond, and image receptive material 20 disposed between and/or around the microbeads. The security laminate 40 is bonded to a substrate 52 wherein the substrate has an image or overt indicia 24 that is preferably visible through the security laminate 10 when viewed under normal lighting conditions. In this embodiment, the retroreflective layer 48 is retroreflective when illuminated with retroreflected light, but no security indicia is present on the beads. An example of such a retroreflective layer comprising microbeads having single or multiple reflector layers is described in U.S. Pat. No. 3,700,305, incorporated by reference herein.

Other useful retroreflective layers comprising glass beads having a reflector layer in a beadbond include those found in CONFIRM ES Security Laminate and any other retroreflective layer having an exposed microbead construction, that is, microbeads partially embedded into a beadbond. The reflector layer is preferably transparent, high refractive index material or is translucent. Examples of useful reflector layer materials include bismuth trioxide, zinc sulfide, titanium dioxide, zirconium oxide, and a stack of zinc sulfide/$Na_3AlF_6$.

Typically, the microbeads of the retroreflective layer are about hemispherically embedded into the beadbond. However, the amount of the microbeads embedded into the beadbond may vary from about 25 to about 75% of the microbead diameter.

Generally, the amount of ink receptive material present in between and/or around the microbeads depends upon the volume of the microbeads that is not embedded in the beadbond. The amount is not limited as long as the microbeads remain retroreflective, that is, some or a substantial portion, or all of the microbeads may be covered with transparent ink receptive material, provided that the microbeads remain retroreflective, preferably after the ink receptive material is imaged. Preferably, the microbeads are not completely covered with ink receptive material.

Microbeads used in the security laminates are typically glass and range in size of from about 10 to about 200 micrometers. In another embodiment, the glass beads range in size from about 25 micrometers to about 75 micrometers. Such glass microbeads typically have a refractive index of at least about 1.8.

Useful beadbonds comprise urethanes, acrylics, hot melt adhesives, and combinations thereof. Preferably, the beadbond is transparent.

Useful adhesives for bonding to the beadbond include hot melt adhesives, such as those which comprise ethylene/acrylic acid (EAA) copolymers, ethylene/vinyl acetate (EVA) copolymers, ethylene/ethyl acrylate (EEA) copolymers, ethylene/methyl acrylate (EMA) copolymers, and polyethylene. Preferably, the adhesive is transparent.

Image Receptive Material

The image receptive material of the security laminates of the invention is used to accept images or other information in a discernable or readable form. Typically, the image receptive materials are water and abrasion resistant. Preferred image receptive materials are capable of receiving an image comprising aqueous ink. In another embodiment, the image receptive material is capable of receiving an image from an inkjet printer. Preferably, the image receptive material is transparent. Useful image receptive materials include multi-valent metal salts such as aluminum sulfate, vinylpyrrolidone homopolymers and copolymers and substituted derivatives thereof; vinyl acetate copolymers, for example, copolymers of vinylpyrrolidone and vinyl acetate, copolymers of vinyl acetate and acrylic acid; polyvinyl alcohol; acrylic acid homopolymers and copolymers; cellulosic polymers; styrene copolymers with allyl alcohol, acrylic acid, and/or maleic acid or esters thereof; alkylene oxide polymers and copolymers; gelatins and modified gelatins; polysaccharides; and the like as disclosed in U.S. Pat. Nos. 5,766,398; 4,775,594; 5,126,195; 5,198,306. Such materials may optionally also include inorganic materials such as alumina and/or silica particles.

In one embodiment, the image receptive material comprises polyvinylpyridine and may further include a crosslinker and/or a mordant. Polyvinylpyridines, when at least partially neutralized with an appropriate acid, are water-soluble polymers that can be crosslinked. A preferred polyvinylpyridine is poly(4-vinylpyridine). The image receptive materials may contain from greater than 15 to about 100 dry weight percent polyvinylpyridine. In one embodiment, an image receptive material of the invention contains at least greater than 15 weight percent polyvinylpyridine on a dry basis. In other embodiments, the image receptive material contains at least 20, at least 25, at least 30, or at least 35 weight percent polyvinylpyridine. In other embodiments, the image receptive material contains from about 20 to 100, about 30 to 100, about 40 to 100, about 45 to 100, or about 45 to 85 weight percent polyvinylpyridine on a dry basis and any whole or fractional amount between 20 and 100 weight percent.

The image receptive materials of the invention may contain one or more crosslinkers. The crosslinker provides a durable ink receptor by crosslinking the polyvinylpyridine. Useful crosslinkers include, but are not limited to, polyfunctional aziridine compounds (for example, XAMA-2 and XAMA-7, available from Sybron Chemicals, Birmingham, N.J.), polyfunctional epoxy compounds (for example, HELOXY Modifier 48, available from Resolution Performance Products, Houston, Tex., or CR-5L, available from Exprit Technologies, Sarasota, Fla.), polyfunctional isopropyloxazoline compounds (for example, EPOCROS WS-500, available from Exprit Technologies, Sarasota, Fla.), and epoxy functional methoxy silane compounds (for example, Z-6040 SILANE, available from Dow Corning, Midland, Mich.).

The image receptive materials of the invention may contain an effective amount of crossslinker to crosslink the polyvinylpyridine so to form a durable and waterfast receptor. The number of crosslinking sites per unit mass of crosslinker typically characterizes the effectiveness of a particular crosslinker. The number of crosslinking sites (also sometimes referred to as "equivalents") refers to the maximum number of bonds that an amount of crosslinker is theoretically able to form with a material to be crosslinked. An equivalent weight refers to the number of grams of crosslinker that contains 1 mole of equivalents or crosslinking sites.

Image receptive materials of the invention may contain from about 0.006 to about 1.5 millimoles crosslinking sites, from about 0.03 to about 0.6 millimoles crosslinking sites, or from about 0.03 to about 0.3 millimoles crosslinking sites per gram of polyvinylpyridine.

The image receptive materials comprising polyvinylpyridine may contain one or more mordants. A "mordant" as used herein is a material that forms a bond or interaction with dyestuffs in inks. A mordant is used to fix the ink dyestuffs so to provide increased durability to images, particularly water resistance. Preferred mordants are those materials or compounds that contain cationic moieties, for example, quaternary amino groups. Useful mordants include, but are not limited to, FREETEX 685 (a polyquaternary amine, available from Noveon, Inc., Cleveland, Ohio), DYEFIX 3152 (a ammonium chloridecyanoguanidine-formaldehyde copolymer, available from Bayer, Pittsburgh, Pa.), GLASCOL F207 (2-Propen-1-aminium, N,N-dimethyl-N-2-propenyl-, chloride, homopolymer, available from Ciba Specialty Chemicals). The image receptive materials comprising polyvinylpyridine may contain up to about 70, up to about 60, up to about 50, up to about 40, or up to about 30 dry weight percent mordant and any whole or fractional amount between zero and 70 dry weight percent. In other embodiments, the image receptive materials may contain from about 40 to about 90 weight percent mordant.

The security laminates of the invention are generally made by applying an image receptive material composition to a retroreflective layer such that the microbeads protrude or nearly protrude from the image receptive material, and then drying the composition to form the image receptive material. Drying may be done at room temperature or at elevated temperature.

The image receptive material composition may be applied to a retroreflective layer by commonly known methods such as Mayer Rod.

A typical method for making the retroreflective layer of the security laminates of the present invention is described in U.S. Pat. No. 3,801,183. In general, the method comprises the steps of coating the microbeads onto a pressure-sensitive adhesive or polyethylene coated carrier paper, optionally, printing an indicia on the microbeads, applying a reflector to the microbeads (over the indicia, if present), applying a beadbond composition over the reflective microbeads to form a beadbond, applying an adhesive layer, for example, a hot-melt adhesive layer, over the beadbond, and then removing the carrier paper to expose the microbeads. Optionally, the retroreflective layer having an adhesive layer on the beadbond may include a release liner over the adhesive layer.

The security laminates of the invention may be imaged using inks through known imaging techniques such as inkjet printing. Advantageously, the security laminates of the invention may be imaged using an inkjet printer and aqueous inks. The inks may utilize pigment or dye-based colorants.

The security laminates of the invention can be used with any document of value such as passports, identification cards, labels, entry passes, ownership certificates, financial instruments, and the like. The document of value may be non-woven or woven. The security laminates of the invention may be imaged and adhered to a document of value or imaged, adhered to a backing, and then inserted into a document, such as a passport, as part of the manufacturing process. Alternatively, the security laminates of the invention may be first attached to or inserted into the document, and then imaged.

EXAMPLES

All of the amounts given are by weight unless otherwise stated. Unless otherwise stated, all of the components are available from Aldrich Chemical Co., Milwaukee, Wis. Water used was de-ionized.

"CONFIRM ES" is a brand of a security laminate having glass beads in a beadbond, available from Minnesota Mining and Manufacturing Company, Saint Paul, Minn.

"FREETEX 685" is a trade designation for a cationic polyamine, available from Noveon, Inc., Cleveland, Ohio.

"HELOXY MODIFIER 48" is a trade designation for a polyfunctional epoxy crosslinker, available from Resolution Performance Products, Houston, Tex.

"REILLINE 420" is a trade designation for a solution of 40% poly(4-vinylpyridine), available from Reilly Industries, Inc., Indianapolis, Ind.

Example 1

The following three compositions were prepared.

Composition A: Prepared by adding 2 parts glacial acetic acid to 10 parts REILLINE 420, mixing well, then adding 5 parts IPA, mixing well, then adding 15 parts water.

Composition B: Prepared by mixing 10 parts FREETEX 685 with 38 parts water.

Composition C: Prepared by mixing 1 part HELOXY MODIFIER 48 with 15 parts ethanol.

A piece of CONFIRM ES was placed on top of an approximately 5 mm thick aluminum plate with the exposed retroreflective bead side of the CONFIRM ES facing away from the plate. A corona treatment was applied to the exposed microbead side of the CONFIRM ES by passing a high frequency generator (120 volts, 50/60 Hertz, 0.35 amps, available from Electro Technic Products Inc., Chicago, Ill.) approximately 20 mm above the surface of the CONFIRM ES. A mixture comprising 21 parts of Composition A, 4 parts of Composition B, and 1 part of Composition C was prepared. This image receptive material composition was coated using a #4 Mayer rod (nominal wet thickness=0.009 mm) onto the exposed retroreflective bead side of the CONFIRM ES laminate, followed by drying in an oven at approximately 80° C. for approximately 5 minutes.

Upon viewing the coated CONFIRM ES with a retroreflective viewer, the retroreflective beads could clearly be observed to be retroreflective and the security indicia could be observed. This material was then printed on the coated side using an Epson Stylus C80 inkjet printer equipped with aqueous pigmented inkjet inks (printer and T032120 black and T032520 multi color cartridges all available from Epson America, Inc., Long Beach, Calif.). The resulting image exhibited high color density and excellent line sharpness with no bleed or feathering between colors.

The imaged sample was submerged in water for about 24 hours, and the image quality was virtually unchanged with very little bleed or feathering between colors. An additional imaged sample was submerged in methyl ethyl ketone for about 24 hours. The yellow colorant was nearly completely removed, but the remaining colorants (black, cyan, and magenta) remained on the sample. An additional sample was submerged in a solution comprising 5% ammonium hydroxide in water for about 24 hours, and the image quality was virtually unchanged with very little bleed or feathering between colors.

Example 2

Coated samples were prepared as in Example 1. The coated samples were printed with a Hewlett-Packard Deskjet 970Cse inkjet printer equipped with pigment-based black aqueous inkjet ink (cartridge 51654A) and dye-based color (cyan, magenta, yellow) aqueous inkjet ink (cartridge C6578DN) (printer and cartridges all available from Hewlett-Packard, Palo Alto, Calif.). The printed samples were submerged in water, methyl ethyl ketone, and 5% ammonium hydroxide in water for about 24 hours as in Example 1. In both cases, a significant portion of the colorants was retained on the sample.

Example 3

Coated samples were prepared as in Example 1 except that the image receptive material composition coated comprised 5 parts aluminum sulfate, 0.5 parts dioctyl sulfosuccinate sodium salt, 75 parts water, and 25 parts isopropyl alcohol. Upon viewing the coated CONFIRM ES substrate with a retroreflective viewer, the retroreflective beads could clearly be observed to be retroreflective and the security indicia could be observed. The coated CONFIRM ES was printed as in Example 1. The resulting image exhibited high color density and excellent line sharpness with no bleed or feathering between colors. Results of submersion in water, methyl ethyl ketone, and 5% ammonium hydroxide in water for about 24 hours were similar to those in Example 1.

What is claimed is:

1. A transparent or translucent security laminate comprising:
- a retroreflective layer comprising:
  - a plurality of retroreflective microbeads partially embedded in a beadbond, having a reflector layer embedded in the beadbond,
  - having image receptive material disposed between microbeads, where the microbeads protrude from the image receptive material in a manner such that the microbeads remain retroreflective, and
  - having an overt image on the image receptive material, wherein the overt image comprises an aqueous ink.

2. The security laminate of claim 1 further comprising security indicia viewable under retroreflective light.

3. The security laminate of claim 1 wherein the image receptive material comprises polyvinylpyridine.

4. The security laminate of claim 1 wherein the overt image comprises a dye or pigment based ink.

5. The security laminate of claim 1 wherein the aqueous ink is an inkjet ink.

6. The security laminate of claim 1 wherein the image includes a printed image of a human face, signature, fingerprint, alphanumeric information, a barcode, or any combination thereof.

7. The security laminate of claim 1 further comprising a carrier paper over the microbeads.

8. The security laminate of claim 1 wherein the image receptive material comprises a multi-valent metal salt.

9. A security document comprising in combination:
- (a) a security laminate of claim 1; and
- (b) a document of value, wherein the security laminate is inserted or otherwise attached to the document of value.

10. The security document of claim 9 wherein the document of value is a passport, identification card, financial instrument, entry pass, or ownership certificate.

11. The security document of claim 9 wherein the document of value is woven or non-woven.

12. A method of imaging a security laminate comprising the step of printing an image onto a security laminate of claim 1.

13. The method of claim 12 wherein the image is printed using an inkjet printer.

14. A method of making a security document comprising the steps of:
- providing a security laminate of claim 1; and
- providing instructions for printing and attaching said security laminate to a document of value.

15. The method of claim 14 wherein the document of value is a passport, identification card, financial instrument, entry pass, or ownership certificate.

* * * * *